Dec. 12, 1950 W. J. KING 2,533,890
DEVICE FOR MEASURING ANGLES AND OTHER DIMENSIONS
Filed May 31, 1946 2 Sheets-Sheet 1
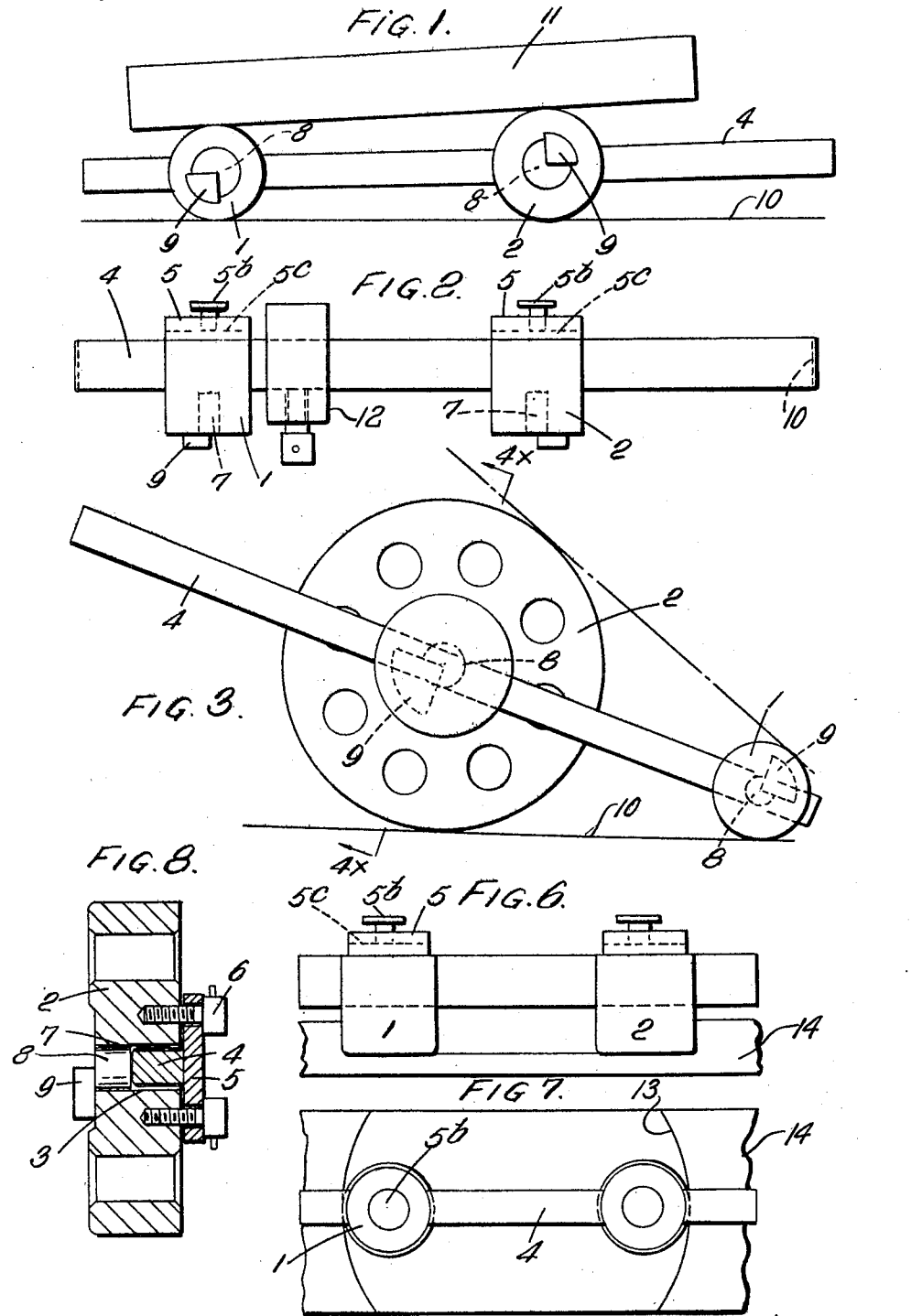

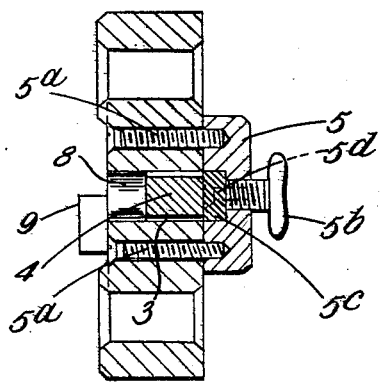
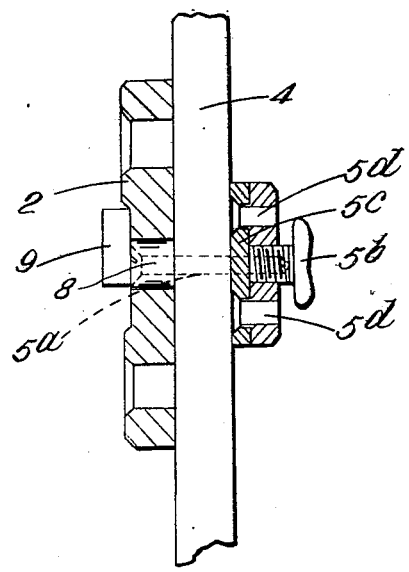

UNITED STATES PATENT OFFICE 2,533,890

DEVICE FOR MEASURING ANGLES AND OTHER DIMENSIONS

William John King, Brighton, England

Application May 31, 1946, Serial No. 673,435
In Great Britain May 11, 1945

2 Claims. (Cl. 33—174)

The subject of the present invention is a precision measuring device for obtaining accurate setting of faces at an angle without the necessity for block gauges, for measuring inside and outside diameters, for measurement from flat to concave surfaces, for making measurements between flat surfaces, and for other purposes.

The device of the invention comprises a pair of discs or cylinders each provided with a diametral slot by which they may be slid along a bar to allow the distance between the centres of the discs or cylinders to be set to any desired dimension with means for clamping them to the bar in any adjusted position. The discs or cylinders are suitably also provided on the face opposite the slotted face with centre pegs which are a push fit in bores in the discs whereby the distance apart of the centres of the discs may conveniently be set to rule dimensions.

In practice a plurality of discs of different known diameters but similar in other respects will be provided in order to provide different ranges of measurement and bars of different length will be provided for convenience in use. Work locating stops may also be provided to facilitate the setting up or inspection of identical work pieces. A second bar or a parallel may also be provided for use when the angle included between tangents to the spaced discs is to be used, and the angle is such that the distance between the discs is greater than the length of the work piece.

In setting the face of a work piece at an angle to a surface plate with the device a pair of discs of known and unequal diameters is used and they are set at a distance apart on the bar corresponding to the figure obtained by multiplying the difference of the radii of the two discs by the cosecant of one half the desired included angle between the common tangents to the two discs, which figures are provided in tables supplied with the measuring device or can be obtained from trigonometrical tables. The device is placed on the surface plate and the article to be measured or set at the desired angle is placed in contact with the bar joining the two discs. If twice the angle is to be used the article may be placed in contact with the two discs or on a second bar or parallel contacting the two discs.

The invention is illustrated in the accompanying drawing in which Fig. 1 is a side elevation of the device placed on a surface plate with a second bar or parallel contacting the discs while Fig. 2 is a plan view of the device but showing a work stop in position on the bar and omitting the second bar or parallel. Fig. 3 is a side elevation illustrating how a large angle is obtained by using a small disc in conjunction with a large disc and with a short distance between the centres of the discs. Fig. 4 is a section on the line 4x—4x of Fig. 3 and Fig. 5 a section at right angles thereto showing one form of clamping means for clamping the disc to the bar while Fig. 6 is a side elevation and Fig. 7 a plan showing how the device is used for determining the dimensions of an internal bore. Fig. 8 is a section through a disc showing another form of clamping means.

Referring to the drawings, the improved measuring device comprises a pair of discs or cylinders 1, 2 of unequal but known diameters slotted diametrally at 3 (Figs. 3 and 8) so as to be a sliding fit on a bar 4 which may be suitably graduated according to tables of calculations. Alternatively, a special rule may be provided graduated in degrees and minutes to agree with given pairs of discs. In the form of clamping means shown in Figs. 1 to 7 the discs are adapted to be locked in adjusted position on the bar 4 by means of a clamping plate 5 secured to the discs by cheese head or socket head screws 5a (Figs. 4 and 5) passing freely through the disc and holding the clamping plate 5 to the disc, clamping being effected by a single thumb screw 5b screwing into the disc and engaging a metal pad 5c guided and retained by pins 5d and adapted to press on the bar 4. In the form shown in Fig. 8 the discs 1, 2 are adapted to be locked in adjusted position on the bar 4 by means of a clamping plate 5 clamped in position by means of screws 6 passing through the clamping plate and into the disc these screws as shown being provided with a tommy bar.

The discs 1, 2 are shown as provided on the face remote from the slotted face with a central bore 7 in which are push fit pegs 8 having a portion of larger diameter machined to leave an exposed quadrant 9, the quadrants serving as guides in obtaining the centres of the discs for setting them to rule dimensions. Each tool will comprise a set of discs of different but known diameters the smallest disc being used with any of the others.

In the application shown in Figs. 1 to 3 the tool is placed on the surface plate 10 or the like with the discs set apart so that the bar 4 will be at an angle of 1° to the surface plate. The bar therefore forms a surface on which a work piece can be set at an angle of 1° to the surface plate. A second bar or parallel 11 contacting the two discs 1, 2 will be at an angle of 2° to the surface plate and forms therefore a surface on which a work piece can be set at 2° to the surface table.

It will be appreciated that by moving the larger disc along the bar different angles of the bar to the surface plate are provided and determined.

In Fig. 2 a work stop 12 is shown in position on the bar 4.

If R is the radius of the larger disc and r that of the smaller it can be shown that the cosecant of the angle of the bar to the surface plate is the distance between centres multiplied by $$\frac{1}{R-r}$$

which is a constant. The included angle of common tangents to the discs is twice that of the bar 4 to the base.

As an example to set the tool therefore at an included angle of 10° divide 10 by 2 thus obtaining 5° as the angle of the bar 4 to the base or surface plate. Using discs of .800" and 1.300" diameter it is found that the constant obtained from the range tables is 4. The cosecant of 5° being 11.4737 the centre distance required is 2.8684".

If block gauges are used it is necessary to subtract the sum of the two radii of the discs from 2.8684" and build up the gauges to this value. The block gauges should be set on the bar at right angles to the diametral slot in the disc.

If a micrometer is being used, the sum of the two radii (1.050") is added to 2.8684", and the micrometer set to this figure (3.9184"). One of the discs on the bar is locked and the other slid along until it makes contact with the micrometer spindle or block gauges as the case may be. Then the clamps are tightened and the tool is ready for use.

Similarly, the tool can be set to a given taper per foot by use of appropriate tables.

In Fig. 3 the larger disc 2 is shown as perforated for the sake of lightness.

In Figs. 6 and 7 is shown how the diameter of a recess or bore 13 in a work piece 14 may be measured. As shown a convenient set of discs 1, 2 is mounted on the bar 4 and one is locked. The other is slid along the bar 4 in the bore or recess until it is found by trial, as in the case of a Vernier caliper, that the full diameter has been found. This disc is then locked in position, a check taken, and the dimension transferred to the micrometer. It may also be obtained by building up block gauges between the discs and adding the two diameters. The device is similarly used to obtain the dimensions of slots and to check their parallelism.

It will be appreciated that the device may be used for obtaining the diameter of a spigot or the distance from a bore to an edge and for other purposes.

For instance to obtain the centre distance of two bores, the discs are placed in contact with the adjacent walls of the two bores and the dimension measured. If the diameters of the two bores are known the centre distance can be readily calculated. If not a second reading with the discs in contact with the remote edges of the bores can be taken and the two readings divided by 2 giving the centre distance.

I claim:

1. A precision measuring device comprising a pair of measuring cylinders of known diameter the peripheral surfaces of which are adapted to engage the work piece in a measuring operation, each of said cylinders having a diametral slot, a straight bar fitted in the slots of the cylinders and along which the cylinders are adapted to be slid for engaging the work piece, a clamping means for clamping the cylinders in position on the bar for effecting a measuring operation on the work piece, and a quadrant block projecting from the face of each cylinder with its axial edge coincident with the axis of the cylinder, said quadrant blocks being on the same side of the device whereby the distance between the centers of the cylinders may be readily determined.

2. A precision cosecant measuring device for measuring angles with respect to a work piece comprising a pair of measuring cylinders of unequal known diameter the peripheral surfaces of which are adapted to engage the work piece in a measuring operation, each of said cylinders having a diametral slot, a straight bar fitted in the slots of the cylinders and along which the cylinders are adapted to be slid for engaging the work piece, a clamping means for clamping the cylinders in position on the bar for effecting a measuring operation on the work piece, and a quadrant block projecting from the face of each cylinder with its axial edge coincident with the axis of the cylinder, said quadrant blocks being on the same side of the device whereby the distance between the centers of the cylinders may be readily determined.

WILLIAM JOHN KING.

REFERENCES CITED

The following references are of record in the file of this patent:

UNITED STATES PATENTS

| Number | Name | Date |
|---|---|---|
| 365,031 | Traut | June 14, 1887 |
| 534,152 | Heinkel | Feb. 12, 1895 |
| 955,347 | Nevanas | Apr. 19, 1910 |
| 1,409,343 | Karasick | Mar. 14, 1922 |
| 1,500,623 | Hurd | July 8, 1924 |
| 2,300,448 | Ludwig | Nov. 3, 1942 |

OTHER REFERENCES

American Machinist, page 801, May 21, 1931.